Dec. 16, 1941.  C. S. McCARTHY  2,266,058
MECHANISM CONTROL
Filed Dec. 4, 1939  3 Sheets-Sheet 1
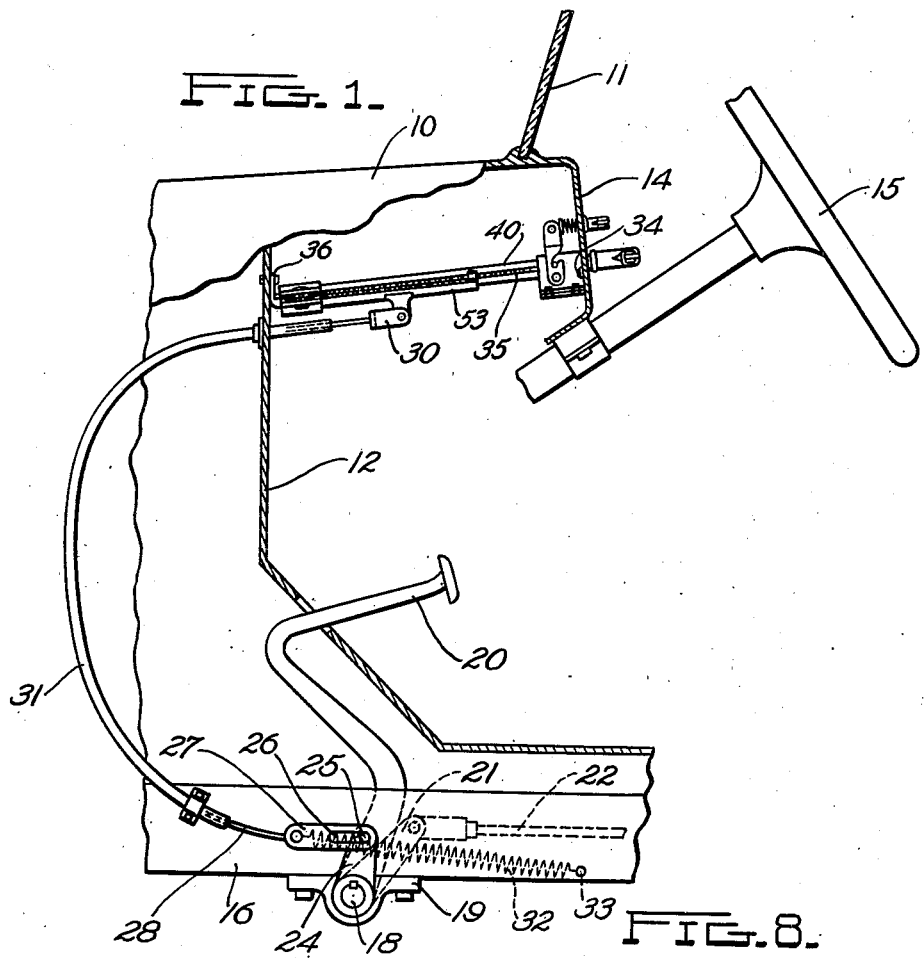
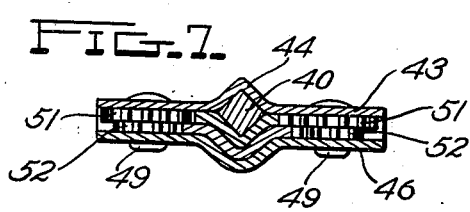
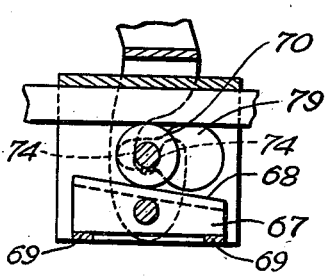
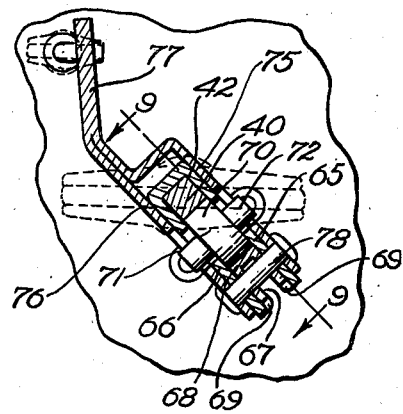
INVENTOR
*Charles S. McCarthy*
BY
*Braselton, Whitcomb Davies*
ATTORNEY Dec. 16, 1941.　　　C. S. McCARTHY　　　2,266,058
MECHANISM CONTROL
Filed Dec. 4, 1939　　　3 Sheets-Sheet 2
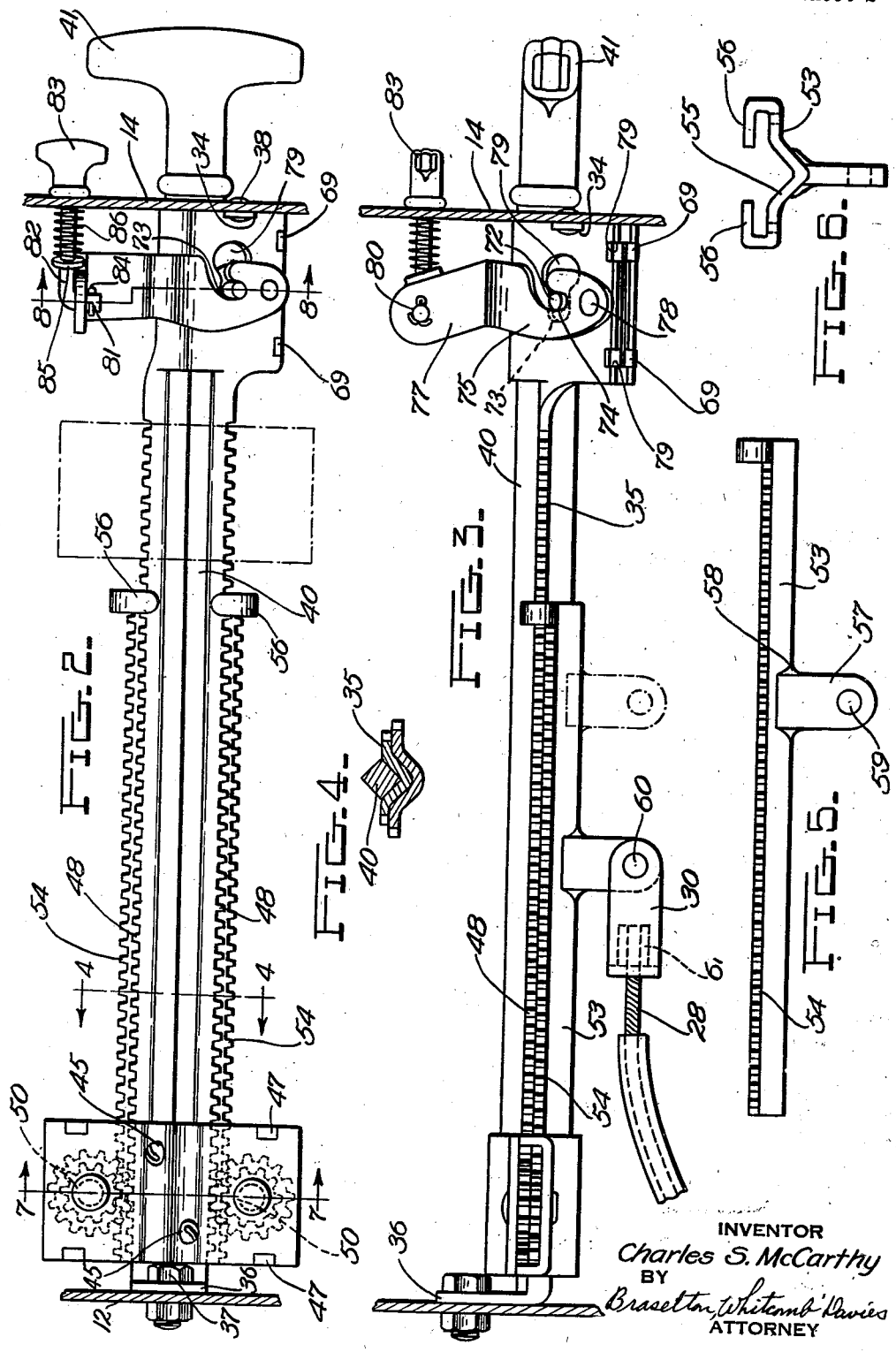
INVENTOR
Charles S. McCarthy
BY
Braselton, Whitcomb & Davies
ATTORNEY Dec. 16, 1941.  C. S. McCARTHY  2,266,058
MECHANISM CONTROL
Filed Dec. 4, 1939  3 Sheets-Sheet 3
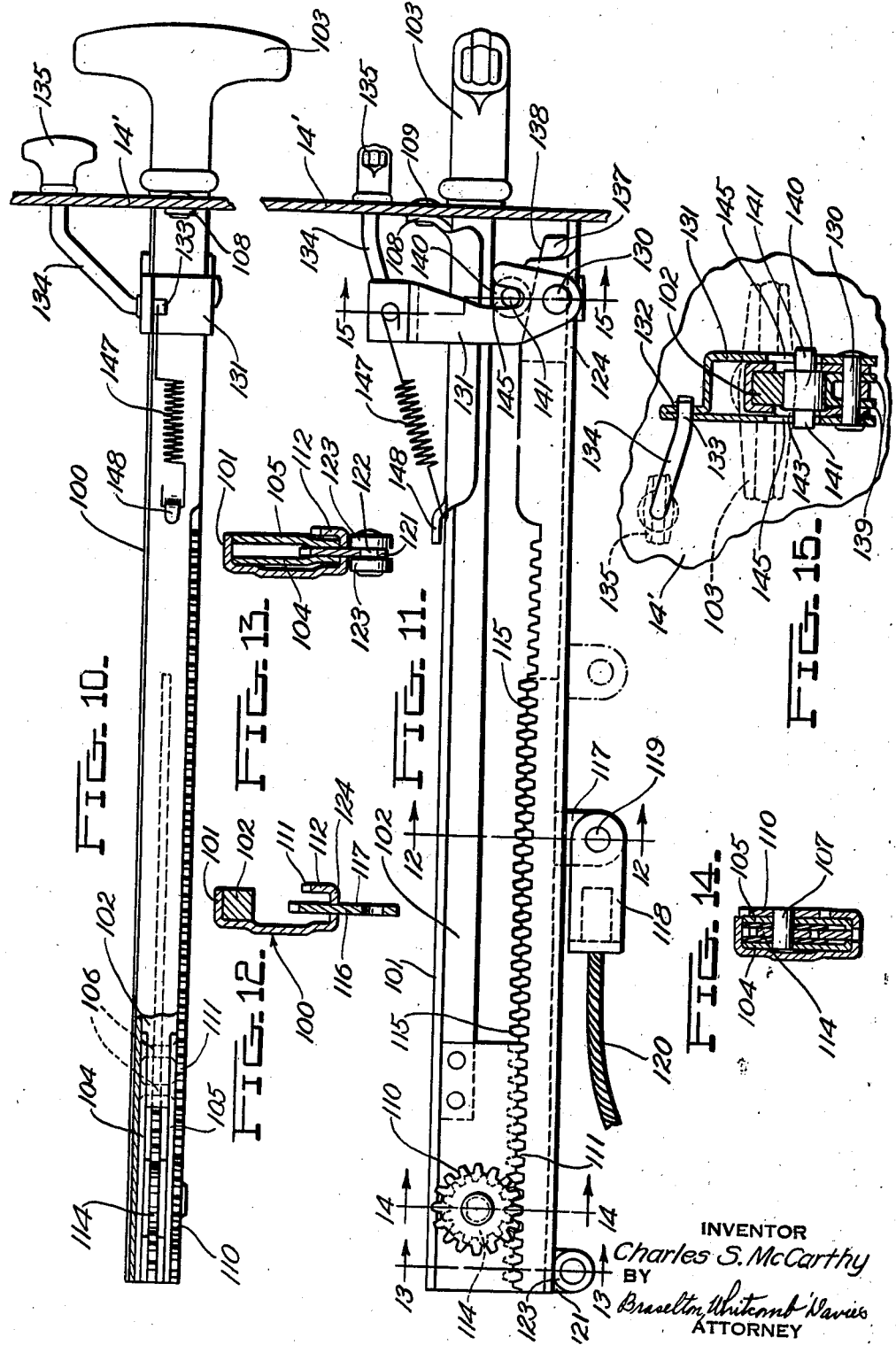
INVENTOR
Charles S. McCarthy
BY
Braselton, Whitcomb & Davies
ATTORNEY Patented Dec. 16, 1941

2,266,058

UNITED STATES PATENT OFFICE 2,266,058

MECHANISM CONTROL

Charles S. McCarthy, Toledo, Ohio, assignor to The Bingham Stamping Company, a corporation of Ohio Application December 4, 1939, Serial No. 307,382

19 Claims. (Cl. 74—502)

This invention relates to mechanism actuators or controls and more particularly to an arrangement for actuating or controlling braking mechanism of an automotive vehicle.

The invention has for an object the provision of control mechanism embodying a novel force multiplying means of simple construction for effectively actuating or controlling brakes of a vehicle.

The invention includes the provision of mechanism which may be actuated by direct "pull" upon a manipulating member in combination with force multiplying means for transmitting motion of the manipulating member to the braking mechanism.

Another object of the invention is to provide a mechanism actuating arrangement having force multiplying arrangement coupled with relatively stationary lock or clutch releasable by means independent of the mechanism actuating means.

The invention is also inclusive of a brake manipulating device of the "direct pull" type embodying means for multiplying the force applied by the operator without the interposition of pivotally supported levers so that a much greater force is transmitted to the braking mechanism of the vehicle than is exerted by the operator.

Still another object of the invention is the provision of a simple yet effective force multiplying means wherein movement of one of the elements is transmitted to another element movable in the same direction at a differential speed whereby the effective force is increased in application to the other element.

Still a further object of the invention is to provide a brake controlling mechanism wherein the elements are adapted for movement in parallel directions and are adapted to be conveniently positioned with respect to the operator as adjacent the instrument panel of the vehicle, the arrangement having a clutch releasing means within convenient reach of the operator.

A further object of the invention is to provide a simplified control means especially adapted for actuating and controlling braking mechanism wherein the major elements are formed of sheet metal, thus facilitating the ease of manufacture, assembly, and interchangeability of the parts, as well as effecting substantial reductions in the cost of control mechanism.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a fragmentary sectional view of a portion of the operator's compartment of a vehicle illustrating a form of my invention and a method of utilization of the same in actuating the emergency brakes of a vehicle;

Figure 2 is a top plan view of a form of my invention;

Figure 3 is a side elevational view of the arrangement shown in Figure 2;

Figure 4 is a transverse sectional view taken substantially on the line 4—4 of Figure 2;

Figure 5 is a side elevational view of one of the elements of the mechanism control of my invention;

Figure 6 is an end elevational view of the element shown in Figure 5;

Figure 7 is a transverse sectional view taken substantially on the line 7—7 of Figure 2;

Figure 8 is a transverse sectional view taken substantially on the line 8—8 of Figure 2;

Figure 9 is a fragmentary sectional view taken substantially on the line 9—9 of Figure 8;

Figure 10 is a top plan view showing a modified form of my invention;

Figure 11 is a side elevational view of the arrangement of the invention illustrated in Figure 10;

Figure 12 is a sectional view taken substantially on the line 12—12 of Figure 11;

Figure 13 is a sectional view taken substantially on the line 13—13 of Figure 11;

Figure 14 is a sectional view taken substantially on the line 14—14 of Figure 11;

Figure 15 is a sectional view through the locking means taken substantially on the line 15—15 of Figure 11.

While I have shown the arrangement of my invention as utilized for actuating or controlling the brakes of an automotive vehicle, it is to be understood that I contemplate the use of my invention with any mechanism wherever the same may be found to have utility.

Referring particularly to Figure 1 of the drawings, there is illustrated a porton of an automotive vehicle including a cowl portion 10, wind shield 11, dash board 12, instrument panel 14, steering wheel 15, the vehicle body being supported upon a frame structure 16. There is also provided a brake cross shaft 18 journalled in a bracket 19 to the shaft supporting a service brake pedal 20, a bell crank member 21, the latter being connected by means of a rod 22 to the brake mechanism (not shown). Also carried by the shaft 18 is a crank member 24 having a pin 25 operating in a slot 26 in member 27, the latter being connected by means of a cable 28 to a clevis 30 which in turn is connected to the mechanism actuator or control of my invention, which will be hereinafter explained in detail. The cable 28 is suitably guided within a sheath 31 to prevent kinking of the brake actuating cable. The member 27 is also connected to a spring 32 which is anchored to the frame or other suitable portion of the vehicle as at 33 tending to urge the cable and associated mechanism toward "brake released" position. The pin 25 in slot 26 permits the brakes to be set by means of pedal 20 without interfering with the operation of the brake control mechanism of my invention.

With particular reference to Figures 1 to 9 inclusive, illustrating one form of my invention wherein a member or support 35 is provided with a portion 36 secured to the dash board 12 by means of bolt 37. The rear extremity of member 35 is secured through ear portions 34 to the instrument panel 14 by suitable means as, for example, bolts 38. As will be apparent from Figure 4, member 35 is formed with a longitudinal V-shaped depression in which is slidably mounted a manipulating bar 40, the latter having a handle 41 secured to the extremity thereof projecting through instrument panel 14. The portion 42 of member 35 adjacent the instrument panel is of channel configuration as illustrated in Figure 8, the bight portion of the channel serving to form a guide for the bar 40.

Secured to the forward end of the bar 40 is a plate 43 having a centrally raised portion 44 of V-shaped cross section to receive and accommodate the end of bar 40, the bar and plate being secured together by suitable means as, for example, screws 45. Positioned beneath plate 43 is a second plate 46 having upwardly projecting ear portions 47 which project into notches in plate 43 and serve to hold the plates in proper relation, the plates 43 and 46 forming a carriage. The plates are provided with aligned openings through which project stub shafts 49 and mounted between the plates of the carriage and fixedly secured to the stub shafts through the medium of flattened portions 50 on said shafts are sets of toothed wheels or gears, there being in each set a large gear 51 and a smaller gear 52. The openings in the gears 51 and 52 to admit the stub shafts 49 are of a corresponding shape to the stub shaft so that rotary movement of gears 51 is transferred to the smaller gears 52. The longitudinal edges of the support or member 35 are toothed to form racks 48 which are in mesh respectively with each of the larger gears 51. Positioned immediately beneath member 35 is a member 53 which is wider than member 35 and has upon its longitudinally extending edges toothed formation or racks 54 which are in mesh respectively with each of the smaller gears 52. As particularly shown in Figure 6, member 53 is provided with a V-shaped central portion 55 which coincides with and is slidable along the V-shaped central section of member 35, the relation of manipulating bar 40 and members 35 and 53 being illustrated in Figure 4. Member 53 is preferably formed of sheet metal and has upwardly and laterally extending portions or fingers 56 which take over the edges of bar 35 to hold the bars 35 and 53 in proper slidable relationship, member 53 being also provided with a depending ear portion 57 which is welded or otherwise secured to member 53 as at 58, member 57 having an opening 59 adapted to receive a clevis pin 60 which pivotally connects clevis 30 to member 57. The cable 28 may be secured to the clevis by means of collar 61 connected to the end of the cable as illustrated in Figure 3.

It should be noted that the difference in pitch diameter between gears 51 and the smaller gears 52 with respect to the pitch diameters of the larger gears 51 determine the differential of movement between the members 35 and 53 when the handle member 41 is moved carrying with it bar 40 and the carriage consisting of plates 43 and 46 and gearing associated therewith. Thus, in the embodiment illustrated, the pitch diameters of smaller gears 52 is one-fourth smaller than the pitch diameter of the larger gears 51 and hence the ratio of relative movement between bar 40 and member 53 is in the relation of 1 to 4. Thus, when bar 40 is moved to the right as viewed in Figure 2, carrying with it the carriage formed by plates 43 and 46 with the larger gears 51 in mesh with the racks 48 of the relatively stationary member 35, the gears are caused to rotate and due to the difference in the pitch diameters between the gears of each set, member 53 will be moved in the same direction of movement of member 40 but through a lesser distance in the ratio of 1 to 4, that is, if bar 40 is moved a distance of four inches, member 53 will be moved only one inch, but the force acting to move member 53 is multiplied four times. Thus, any ratio of difference in movements between bar 40 and member 53 may be obtained by changing the ratio between the pitch diameters of gears 51 as compared with gears 52. For example, if the difference in pitch diameters between gears 51 and 52 is one-eighth, then if bar 40 is moved through a distance of eight inches, member 53 will be moved through a distance of only one inch, and the force applied to handle 41 to move bar 40 will be multiplied to member 57 for exerting pull on the cable 28 to the extent of ratio of difference in movements between members 35 and 53. Thus, if the difference in movement is 1 to 4, and twenty pounds of force applied to handle 41 to withdraw bar 40 toward the right hand direction as viewed in Figure 2, the force is multiplied to the extent of four times this amount or eighty pounds applied through member 57 and clevis 30 as a pull upon cable 28 connected to the braking mechanism. This gearing system forms a motion translating means whereby a change in amplitude of force and motion is effected between the movable elements.

I have provided locking means for effecting a locking of the bar 40 in brake setting position, which locking means is relatively stationary with respect to bar 40. In the embodiment illustrated and particularly Figure 2, 3, 8 and 9, there is positioned between the side walls 65 and 66 of member 42 a bracket 67 having ear portions 69 which project into slots 79 formed in side walls 65 and 66 to position the bracket in the support, the bracket having a surface 68 angularly disposed with respect to the direction of movement of bar 40. Positioned between an exterior surface of bar 40 and the angular surface 68 of bracket 67 is a clutch or locking roller 70 having tenon portions 71 and 72 which project through clearance slots 73 in side walls 65 and 66 of portion 42, the tenons extending into slots 74 formed in portions 75 and 76 above bracket 67. In order to facilitate assembly of the clutch roller in its proper position, the clearance slots 73, which are of a dimension to accommodate tenon portions 71 and 72 of the clutch roller, terminate in enlarged circular openings 79 in the walls 65 and 66 so as to permit the insertion of the clutch roller in portion 42 of member 35. The portions 75 and 76 of lever member 77 are pivotally joined to the side walls 65 and 66 and member 67 by means of a rivet or shaft 78, as particularly shown in Figures 8 and 9. The upper portion of lever member 77 is provided with an opening 80 through which projects a transversely extending portion 81 of a member 82, the latter extending through an opening in the instrument panel 14 and having a small button or manipulating portion 83 connected thereto. The portion 81 is retained within the opening in member 77 by means of a cotter key 84. On member 82 is a washer 85 forming a stop means and interposed between the instrument panel 14 and the washer 85 and surrounding bar 82 is an expansive coil spring 86 which serves through member 77 to urge the clutch or roller 70 toward locking or clutching position as indicated in Figure 9 between a lower surface of bar 40 and the angularly disposed surface 68 of bracket 67. Thus, when bar 40 is withdrawn in a direction away from the instrument panel 14 through the manipulation of handle 41, the clutch roller 70 overruns along the surface of bar 40, but as soon as movement in a right hand direction of bar 40 as viewed in Figure 2 ceases, the clutch roller 70 is instantly urged under the influence of spring 86 towards wedging or locking position between the angularly disposed surface 68 and a lower surface of bar 40, thus holding the cable 28 in brake setting position, the latter having been moved to the right as viewed in Figure 3 through the differential actuating means including the racks 48 and 54 and sets of gears 51 and 52.

When it is desired to release the brakes or to release the clutch which holds bar 40 in brake setting position, it is only necessary for the operator to grasp the button 83 and move the same away from the instrument panel 14. This movement causes member 83 to oscillate member 77 about shaft 78 to move the clutch or roller 70 out of wedging engagement between bar 40 and the angularly disposed surface 68 as shown in Figure 9, and under the influence of the spring 32 connected to cable 28 as well as the normal "pull" of the brakes toward released position, bar 41 will be moved to the left as viewed in Figure 2 until the elements of the mechanism reach the position illustrated in this figure with the handle 41 adjacent the instrument panel. Thus, with the arrangement of my invention, it is to be noted that the clutch means is relatively stationary with respect to the brake actuating or applying means in the form of bar 40, member 53 and associated elements so that the clutch releasing mechanism in the form of button 83 and member 77 are operated independently of the brake applying manipulating handle 41 so that release of the brakes may not be inadvertently effected, and release thereof cannot be effected except through movement of the clutch releasing means independent of bar 40 and handle 41. This is a safety feature in that handle 41 may not be moved inwardly to release the brakes until the bar 40 has been released by independent movement of the clutch releasing button 83.

A modified form of my invention is illustrated in Figures 10 through 15 inclusive wherein there is projecting rearwardly from the instrument panel 14' an elongated member 100 having a cross sectional configuration as illustrated in Figure 12 except that portion adjacent the instrument panel wherein the configuration is generally C-shaped as illustrated in Figure 15, member 100 having ear portions 108 secured to the instrument panel by means of bolts 109. The member 100 has an upper wall 101 immediately beneath which is positioned a bar 102 which is slidable within member 100 and is provided at the extremity thereof projecting through the instrument panel 14' with a suitable manipulating handle 103. The forward extremity of bar 102 is recessed at either side to accommodate parallel plates 104 and 105 which are riveted as at 106 to bar 102 or otherwise secured thereto. The plates are provided with aligned openings and serve to journally support a transversely extending stub shaft 107 which has a portion projecting exteriorly of plate 105 and to which is fixedly secured a gear 110, the latter adapted for enmeshment with a longitudinally extending toothed or rack portion 111 formed on an upwardly projecting wall 112 of member 100. Also fixedly secured to shaft 107 is a second gear 114 of a lesser diameter than gear 110, the gear 114 being positioned between the plates 104 and 105 and is enmeshed with a rack or toothed portion 115 formed on the upper edge of a drawbar or member 116 which is provided with a depending portion 117. The latter is formed to receive a clevis 118 connected to the member 117 by means of a clevis pin 119, the clevis 118 being connected to the brake actuating cable 120 as illustrated in Figure 11. It is to be noted that the bar 116 is longitudinally slidable in the lower portion of member 100. The rearmost portion of bar 116 is provided with a second depending portion 121 through which projects a suitable shaft 122, the latter carrying comparatively small rollers 123 which during the slidable movement of bar 116 may contact the lower surface of the horizontal portion 124 of member 100 to prevent binding of the drawbar.

The side walls of member 100 near the instrument panel 14' are provided with aligned openings to receive a headed pivot pin 130 and journalled upon pivot pin 130 is a U-shaped bracket 131. The side walls of the upper portion of bracket 131 are brought together as at 132 and are provided with aligned openings to receive and accommodate the extremity 133 of a bar 134, the latter having a portion extending through an opening in the instrument panel 14' and provided with a manipulating button or member 135.

Positioned within the lower U-shaped configuration of member 100 and at the end thereof adjacent the vehicle instrument panel 14' is a member or bracket 137 which has a surface 138 angularly arranged with respect to the lower surface of the manipulating bar 102. The bracket 137 is held in place by means of pin 130 and projections 139 passing through openings in the bottom wall 124 of member 100. Interposed between the lower surface of the manipulating bar 102 and the angularly disposed surface 138 of member 137 is a clutch or roller 140 provided with tenon portions 141, one of which projects through clearance opening 143 in one side wall of member 100, the tenons being received in slots or recesses 145 formed in the side walls of member 131 as particularly shown in Figures 11 and 15. The roller or clutch 140 is at all times urged toward wedging position between the lower surface of bar 102 and the angularly disposed surface 138 through the medium of a contractile spring 147, one end of which is secured to a raised or hook-like portion 148 formed integrally of member 100, the other extremity of the spring being hooked through an opening in portion 133 of bar 134, the spring tending to urge the member 131 in a counter-clockwise direction about the shaft 130 as viewed in Figure 11. The portion of the spring being hooked through an opening in portion 133 serves to prevent disengagement of bar 134 with member 131. The surface 138 makes with the lower surface of bar 102 an included angle of less than 11 degrees, i. e., a wedging angle so that the clutch roller 140 will serve to hold the bar 102 in locked or brake setting position.

In the operation of this form of the invention, when it is desired to "set" the brakes of the vehicle, the operator grasps the handle 103 withdrawing bar 102 along member 100 and through the medium of the gears 110 and 114 a differential movement of drawbar 116 is effected in the same direction of movement as bar 102 but through a lesser distance. The difference in travel between the manipulating member 102 and the drawbar 116 and consequently the difference in the amount of force exerted is dependent upon the difference in the pitch diameters of the gears 110 and 114 bears to the pitch diameter of the larger gear. In the embodiment illustrated, this difference in pitch diameters of the gears is one-fourth of the pitch diameter of the larger gear so that when the bar 102 is pulled outwardly a distance of four inches the drawbar 116 and consequently the cable 120, clevis 118 and portion 117 of the drawbar are moved through a distance of one inch, while the force effective to exert a pull upon cable 120 connected to the brakes (not shown) is four times the pull or force exerted upon the manipulating bar 102. When bar 102 has been withdrawn to a position effecting the "setting" of the brakes, the clutch roller 140 acting under the influence of the spring 147 serves to lock the manipulating member 102 in brake setting position and effects a locking of the drawbar 116 and associated mechanism in brake setting position. When it is desired to release the brakes, the operator grasps button 135 exerting an outward pull upon bar 134 and as the edges of the side walls of member 131 are in contact with the tenons 141 of the clutch roller, the clutch roller is moved out of locking engagement between the lower surface of bar 102 and the angularly arranged surface 138 so that bar 102 and drawbar 116 are returned to normal or "brake released" position under the influence of a spring of the character of spring 32 (see Figure 1) connected to the braking mechanism tending to urge them toward released position.

In this form of the invention the ratio of force exerted upon bar 102 as transmitted to the drawbar 116 may be varied by changing the pitch diameters of gears 110 and 114 so that an infinite number of variations in ratios between these members may be had if desired.

It is apparent that within the scope of the invention modifications and different arrangements may be made other than is herein disclosed, and the present disclosure is illustrative merely, the invention comprehending all variations thereof.

What I claim is:

1. A mechanism control including a relatively stationary support having a toothed section; a manipulating member arranged for slidable movement with respect to said support; a second member having a toothed section movable relatively to said support and said manipulating member and adapted to be connected to the mechanism to be actuated; motion translating means actuated by the manipulating member coacting with the toothed section of said support and the toothed section of said second mentioned member whereby movement imparted to the manipulating member is transmitted with a change in amplitude to the second mentioned member; means carried by said support coacting with the manipulating member for locking the same in position; and means mounted adjacent said manipulating member and cooperatively associated with said locking means for rendering the locking means ineffective.

2. A mechanism control including a support; a manipulating member carried by said support arranged for movement relative thereto; a second member carried by said support and adapted to be connected to the mechanism to be actuated; means rotatable with respect to and carried by the manipulating member interposed between said support and said second mentioned member whereby movement imparted to the manipulating member is transmitted with a change in amplitude to the second member; and relatively stationary clutch means engageable with the manipulating member for locking said members in position against movement with respect to said support.

3. In a mechanism control a relatively stationary support; a manipulating member arranged for slidable movement with respect to said support; a second member slidable relatively to said support in a direction parallel with said manipulating member and adapted to be connected to the mechanism to be actuated; motion translating means actuated by the manipulating member including rotatable elements interposed between said support and said second mentioned member whereby movement imparted to the manipulating member is transmitted with a change in amplitude to the second mentioned member; relatively stationary means interposed between said support and said manipulating member for locking the latter in position; and means cooperatively associated with said locking means for rendering the locking means ineffective.

4. In a mechanism control a support; a member mounted on the support and arranged for movement relative thereto and adapted to be connected to the mechanism to be actuated; rotatable motion translating means including elements having different diameters connecting said support and said member; manual operable means for longitudinally moving said motion translating means whereby the movement imparted to said motion translating means is transmitted to said member at a different rate; relatively stationary clutch means carried by said support in engagement with the manual operable means for restraining movement of said member in one direction with respect to said support; and means cooperatively associated with said restraining means for releasing the latter.

5. In a mechanism control a relatively stationary support; a manipulating member arranged for slidable movement with respect to said support; a second member relatively slidable with respect to said support in a direction parallel with said manipulating member; motion translating means longitudinally movable by the manipulating member including rotatable elements interposed between said support and said second mentioned member whereby movement imparted to the manipulating member is transmitted with a change in amplitude to the second mentioned member; relatively stationary supported one way clutching means engageable with said manipulating member for restraining movement of said members with respect to said support; and means cooperatively associated with said clutching means for rendering the same ineffective.

6. In a mechanism control a relatively stationary element; a member arranged for slidable movement relative to said element and adapted to be connected to the mechanism to be actuated; motion translating means including rotatable elements having different diameters connecting said element and said member; manual operable means for changing the relative position of said motion translating means with respect to said stationary element whereby linear movement imparted to said motion translating means is transmitted to said member at a different rate; relatively stationary means including a roller clutch for restraining movement of said member; and means cooperatively associated with said movement restraining means for releasing the latter.

7. A mechanism control including a V-shaped support; a pair of members carried by said support arranged for relative slidable movement in parallel directions with respect thereto; motion translating means carried by one of said members and connected to the other whereby movement imparted to one of said members causes the other to move at a different rate; and a relatively stationary supported clutch means for restraining movement of said members with respect to said support.

8. A mechanism control including a relatively stationary support; a pair of members having slidable movement in parallel directions with respect to said support; gearing movable by one of said members coacting with the other member whereby movement of one of said members causes differential movement of the other of said members; and a relatively stationary roller clutch for restraining movement of said members with respect to said stationary support.

9. A mechanism control including a relatively stationary element; a pair of members arranged for slidable movement in parallel directions with respect to said element; motion translating means including rotatable elements fixed to a common shaft connecting one of said members and said element whereby movement of one of said members causes differential slidable movement of the other of said members with respect to said element; and a relatively stationary roller clutch for restraining movement of said members with respect to said element.

10. In a mechanism control, a relatively stationary support having a toothed portion; a manipulating means arranged for slidable movement with respect to said support; a member slidable on said support and having a toothed portion; a shaft journalled upon said manipulating means; a pair of spur gears of different diameters fixed on said shaft and meshing respectively with the toothed portion of said support and the toothed portion of said member whereby movement of said manipulating means effects a differential movement of said member; and relatively stationary supported means for restraining movement of said manipulating means in one direction.

11. In a mechanism control, a support having a toothed portion and a longitudinally extending V-shaped channel; a manually operable member slidable in the channel of said support; a movable member slidable along said support and having a toothed portion; a pair of gears of different diameters meshing respectively with the toothed portions of said support and said member; and relatively stationary means for locking said manually operable member against slidable movement with respect to said support.

12. A mechanism control comprising, in combination, a relatively stationary member; a relatively movable member slidable along said stationary member; a manipulating element slidably mounted with respect to said relatively stationary member; motion translating means connected to said manipulating element including a pair of rotatable elements of different pitch diameters having interconnection with said relatively stationary and movable members whereby movement of said manipulating element is transmitted to said movable member at a different rate of speed; relatively stationary supported locking means for restraining movement of said manipulating element; and means operable independent of said manipulating element for effecting a release of said locking means.

13. A mechanism control comprising, in combination, a relatively stationary support; a plurality of members arranged for slidable movement in the same direction with respect to said support; motion translating means associated with said members whereby movement of one of said members is transmitted to the other of said members at a different rate of speed said translating means including a pair of elements fixedly mounted on a rotatable shaft; means including a one-way roller clutch associated with said support and adapted to engage one of said members to lock the said member in predetermined position; and means independent of said members for effecting a release of said locking means.

14. A mechanism control comprising, in combination, a relatively stationary support having a toothed rack portion; a member slidable along said support and having a toothed rack portion; a manipulating member arranged for slidable movement with respect to said support; a carriage connected to said manipulating member; gearing supported upon said carriage and meshing with the rack portions of said support and said movable member whereby movement of the manipulating member is transmitted to the other member at a different rate of speed; a clutch associated with said support and having engagement with one of said members for locking same in adjusted position; a lever member pivotally connected to said support and having engagement with said clutch; and manipulating means connected to said lever member for effecting a release of said clutch.

15. A mechanism control comprising, in combination, a relatively stationary support having a rack portion; a member slidable along said support and having a rack portion; a manipulating member arranged for slidable movement with respect to said support; a carriage connected to said manipulating member; gearing supported upon said carriage and meshing with the rack portions of said support and said movable member; a roller clutch associated with said support and having engagement with said manipulating element for locking the latter in adjusted position; a lever member carried by said support and having engagement with said clutch roller; resilient means for normally urging said clutch roller toward clutching position; and manipulating means connected to said lever member for effecting a release of said clutch roller.

16. A mechanism control comprising, in combination, a relatively stationary support formed of sheet metal and having toothed rack portions formed upon opposite edges thereof; a drawbar formed of sheet metal slidably arranged with respect to said support and having toothed rack portions formed on its opposite edges; a carriage movable along said support; a plurality of sets of gears mounted upon said carriage and in mesh with the rack portions of said support and said slidable member whereby movement of said carriage along said support moves said drawbar along said support at a different rate of speed; and means for restraining movement of said carriage in adjusted position along said support.

17. A mechanism control comprising, in combination, a relatively stationary support formed of sheet metal and having toothed rack portions formed upon opposite edges thereof; a drawbar formed of sheet metal slidably arranged with respect to said support and having toothed rack portions formed on its opposite edges; a carriage movable along said support; manipulating means for said carriage; a plurality of sets of gears mounted upon said carriage and in mesh with the rack portions of said support and said slidable member whereby movement of said carriage along said support moves said drawbar along said support at a different rate of speed; clutch means for holding said manipulating means in adjusted position; and means for effecting a release of said clutch means.

18. A mechanism control comprising, in combination, a relatively stationary support formed of sheet metal and having toothed rack portions formed upon opposite edges thereof; a drawbar formed of sheet metal slidably arranged with respect to said support and having toothed rack portions formed on its opposite edges; a carriage movable along said support; a plurality of sets of gears mounted upon said carriage and in mesh with the rack portions of said support and said slidable member whereby movement of said carriage along said support moves said drawbar along said support at a different rate of speed; a manipulating element connected to said carriage; a roller clutch associated with said support and adapted for engagement with said manipulating element to hold the latter in adjusted position; and means for effecting a release of said clutch.

19. A mechanism control comprising, in combination, a relatively stationary support formed of sheet metal and having toothed rack portions formed upon opposite edges thereof; a drawbar formed of sheet metal slidably arranged with respect to said support and having toothed rack portions formed on its opposite edges; a carriage movable along said support; a plurality of sets of gears mounted upon said carriage and in mesh with the rack portions of said support and said slidable member whereby movement of said carriage along said support moves said drawbar along said support at a different rate of speed; a manipulating element connected to said carriage; a roller clutch associated with said support and adapted for engagement with said manipulating element to hold the latter in adjusted position; a lever member pivotally supported upon said support and having connection with said roller clutch; means connected to said lever member for manipulating the latter independent of said manipulating element for effecting a release of said clutch; and spring means for normally urging said roller clutch toward clutching position.

CHARLES S. McCARTHY.